(12) United States Patent
Lee

(10) Patent No.: US 8,001,785 B2
(45) Date of Patent: Aug. 23, 2011

(54) SOLAR ENERGY-BASED WATER HEATING AND POWER GENERATING MODULE

(76) Inventor: Jeffrey Lee, Taipin (TW)

( * ) Notice: Subject to any disclaimer, the term of this patent is extended or adjusted under 35 U.S.C. 154(b) by 277 days.

(21) Appl. No.: 12/355,804

(22) Filed: Jan. 19, 2009

(65) Prior Publication Data

US 2010/0180885 A1 Jul. 22, 2010

(51) Int. Cl.
- B60K 16/00 (2006.01)
- B60L 8/00 (2006.01)
- F03G 6/00 (2006.01)
- F03G 7/00 (2006.01)
- F01B 29/08 (2006.01)
- F01K 25/00 (2006.01)
- F02G 1/04 (2006.01)

(52) U.S. Cl. ......... 60/641.8; 60/641.13; 60/519; 60/516

(58) Field of Classification Search ............ 60/516–530, 60/641.8, 641.11, 641.12, 641.13, 641.14, 60/641.15; 126/569, 617, 621, 638–640, 126/642, 704–708
See application file for complete search history.

(56) References Cited

U.S. PATENT DOCUMENTS

| | | | | |
|---|---|---|---|---|
| 4,084,578 A | * | 4/1978 | Ishibashi | 126/590 |
| 4,312,181 A | * | 1/1982 | Clark | 60/519 |
| 4,356,697 A | * | 11/1982 | White | 60/682 |
| 6,374,607 B1 | * | 4/2002 | Takabu | 60/527 |

* cited by examiner

Primary Examiner — Thomas E Denion
Assistant Examiner — Christopher Jetton
(74) Attorney, Agent, or Firm — Pai Patent & Trademark Law Firm; Chao-Chang David Pai

(57) ABSTRACT

A solar energy-based water heating and power generating module includes a factory-fabricated compound module panel usable as a cover panel for building, car or ship and capable of absorbing solar energy for heating water flowing in a water chamber and a circulation pipe, and a power generator formed of a field magnet set, an oscillator and a coil and actuated by a temperature difference energy to generate heat.

15 Claims, 12 Drawing Sheets

US 8,001,785 B2

SOLAR ENERGY-BASED WATER HEATING AND POWER GENERATING MODULE

BACKGROUND OF THE INVENTION (a) Field of the Invention

The present invention relates to water heating and power generating modules and more particularly, to a solar energy-based water heating and power generating module that utilizes solar energy to heat water and to further actuate a power generator and that can be used as a building-integrated wall panel for the outer wall of a building, car or ship.

(b) Description of the Prior Art

The development of the utilization of solar energy for alternative energy includes two ways, i.e., the development of photovoltaic silicon for producing an electrical potential difference for generating electricity, and the development of solar collector for making heat exchange with a thermal medium for building thermal energy application, such as domestic hot-water or greenhouse. However, regular commercial semiconductor solar cells have a low efficiency. The energy conversion efficiency of regular commercial semiconductor solar cells is about 10%~1%. When integrating semiconductor solar cells into a building, the installation cost is quite high, however the relative power generation efficiency does not match the high cost. Under the facts of low energy conversion efficiency and high installation cost, it is not practical to integrate semiconductor solar cells into a building. These drawbacks impart a barrier to the development of BIPV (building-integrated photovoltaic) and give limitation to the development of alternative energy.

With respect to the utilization of solar energy for water heating, the development of solar water heater has more than 30-year history, and the related technology has matured. Currently, the energy conversion ratio in this regard is about 80%. A certain ratio of buildings is equipped with a solar water heater system. Under government calling and financial assistance, solar energy heater installation ratio raises year by year. However, conventional solar water heaters simply provide hot water without giving other added values. There will be a great development potential for building-integrated solar energy system to utilize solar energy-heated hot water for generating electricity if cheap installation cost is achievable. This development potential provides a practical way that eliminates the drawbacks of floor space occupation, low power generation efficiency and high cost of the conventional method of using solar collector panels for generating electricity.

SUMMARY OF THE INVENTION

The present invention has been accomplished under the circumstances in view. It is one object of the present invention to provide a solar energy-based water heating and power generating module, which utilizes solar energy to heat water and to further actuate a power generator for generating electricity. It is another object of the present invention to provide a solar energy-based water heating and power generating module, which can be used as a wall panel for the outer wall of a building, car or ship. It is still another object of the present invention to provide a solar energy-based water heating and power generating module, which isolates outside heat energy from entering the indoor space and utilizes outside heat energy to actuate power generators for generating electricity, lowering the frequency of the use of an indoor air-conditioning system and achieving a power-saving effect.

To achieve these and other objects of the present invention, a solar energy-based water heating and power generating module comprises a compound module panel capable of absorbing solar energy, a water chamber mounted in the compound module panel in water communication with two ends of a circulation pipe mounted inside the compound module panel for making heat exchange with the solar energy absorbed by the compound module panel, a power generator house mounted in the water chamber, and one or a number of power generators mounted in the power generator house and actuatable by a temperature difference to oscillate and to further generate electricity.

DETAILED DESCRIPTION OF THE PREFERRED EMBODIMENTS

Referring to the annexed drawings in detail, a solar energy-based water heating and power generating module in accordance with the present invention comprises a compound module panel 1, a water chamber 2, and at least one power generator 3.

Figure 1:
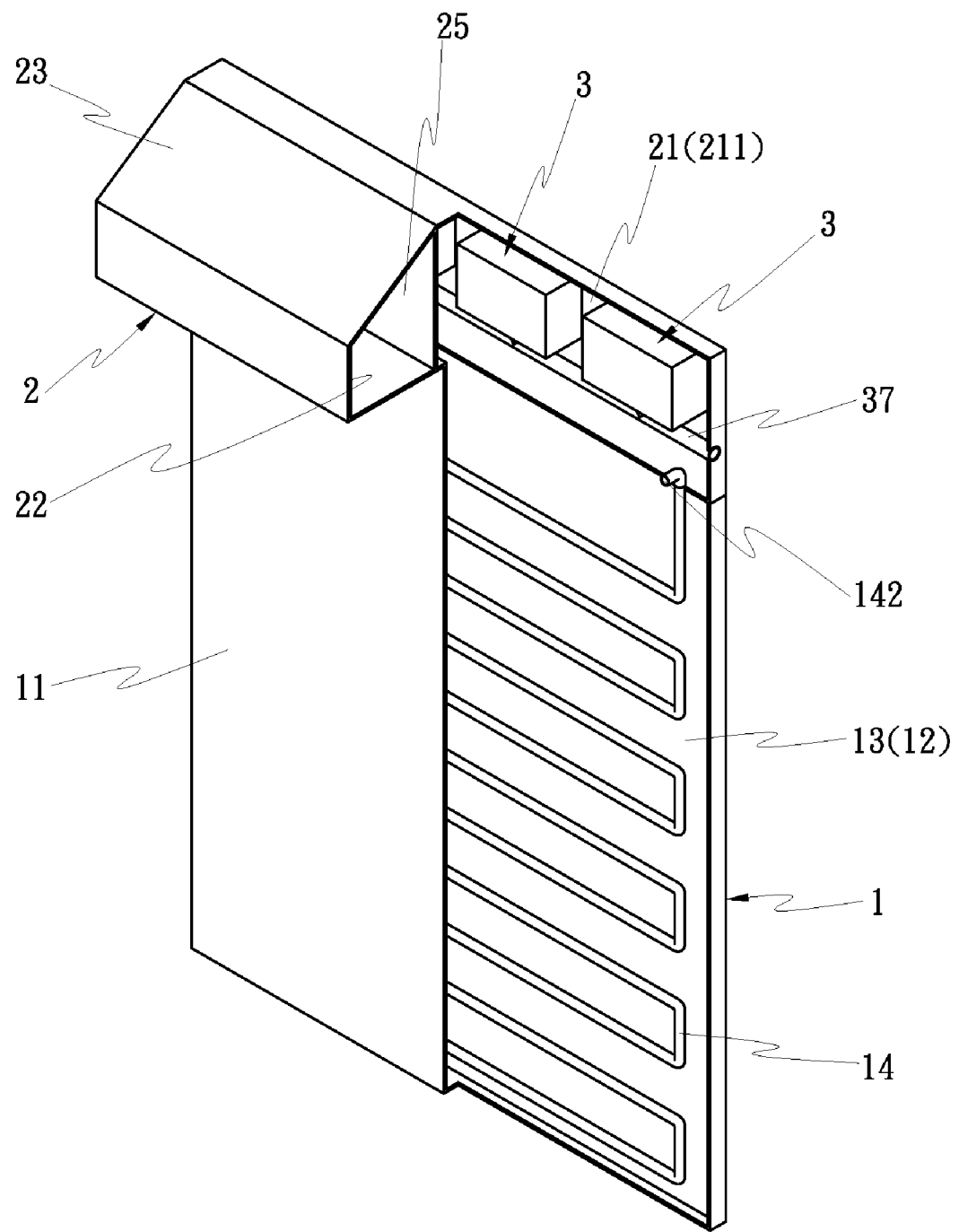
FIG. 1 is a sectional elevation of a solar energy-based water heating and power generating module in accordance with the present invention.
Figure 2:
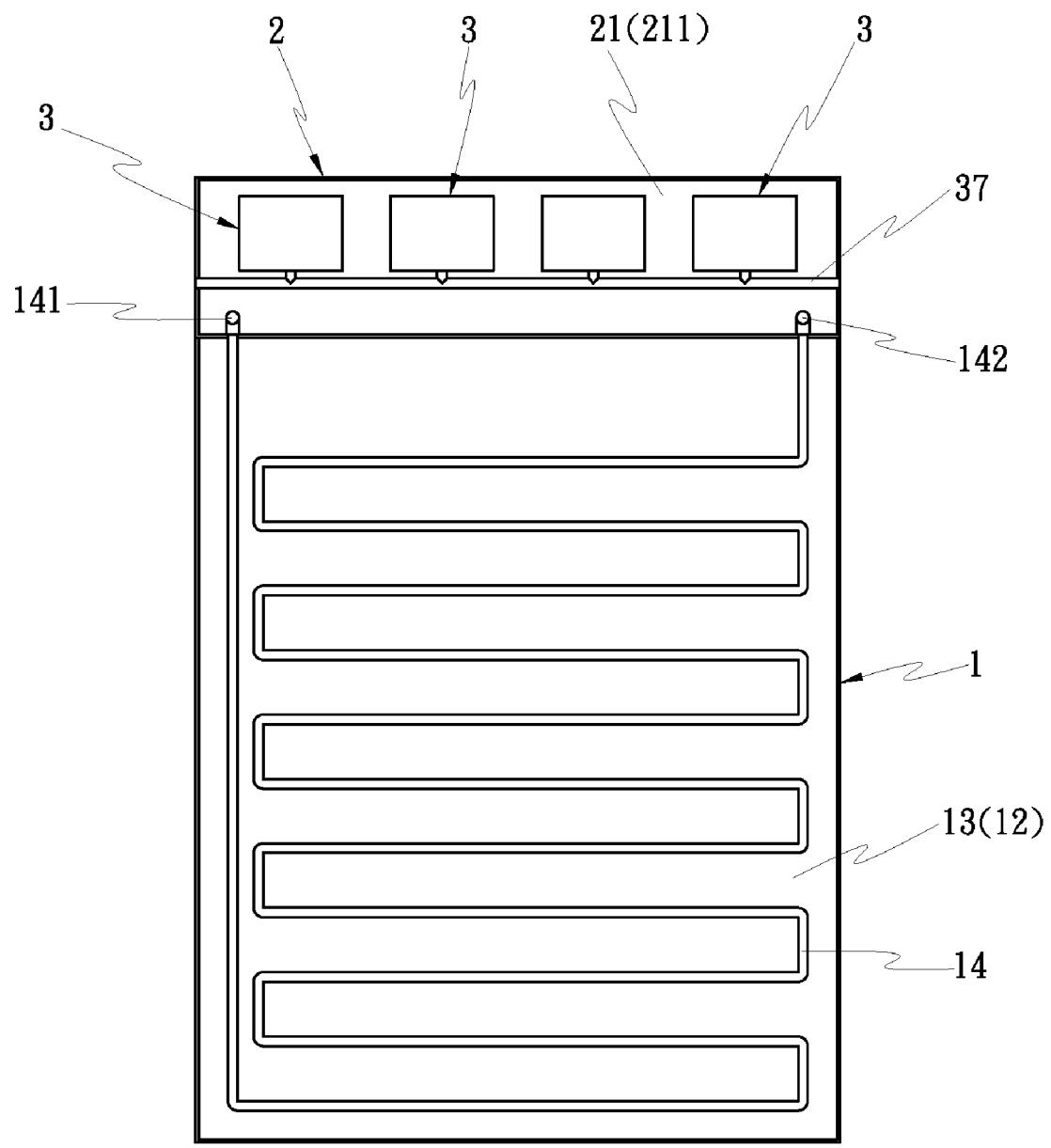
FIG. 2 is a sectional front view of the solar energy-based water heating and power generating module in accordance with the present invention.
Figure 3:
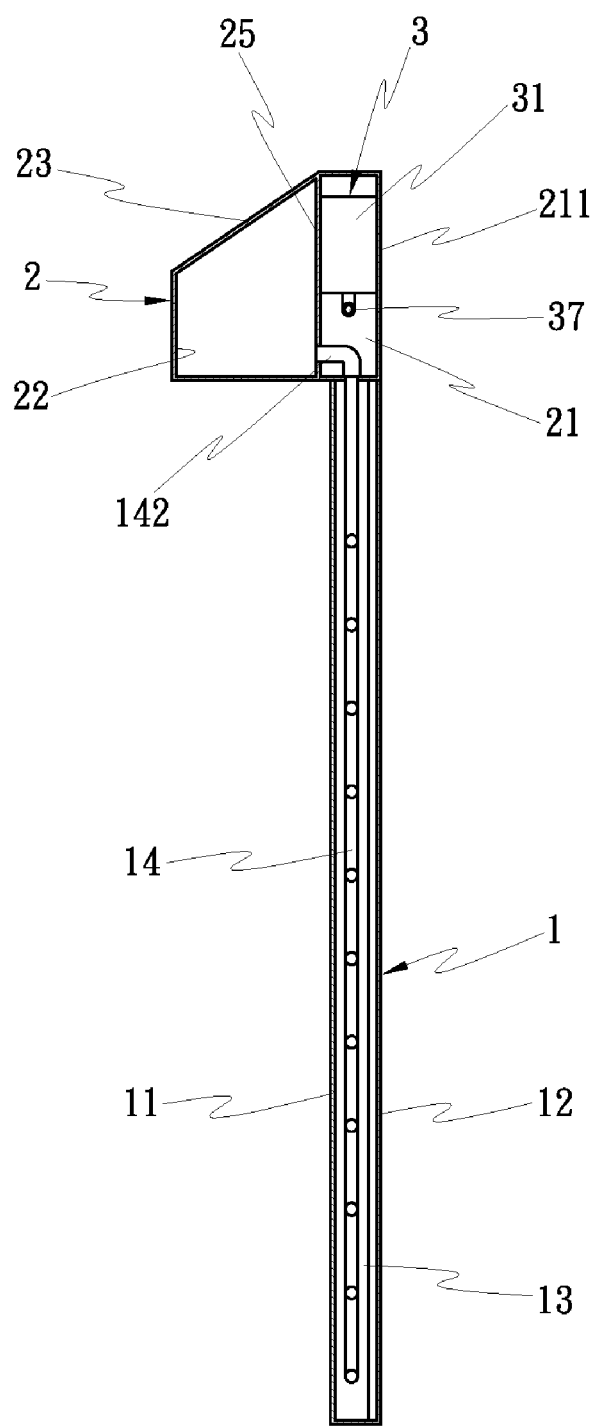
FIG. 3 is a sectional side view of the solar energy-based water heating and power generating module in accordance with the present invention.
Figure 4:
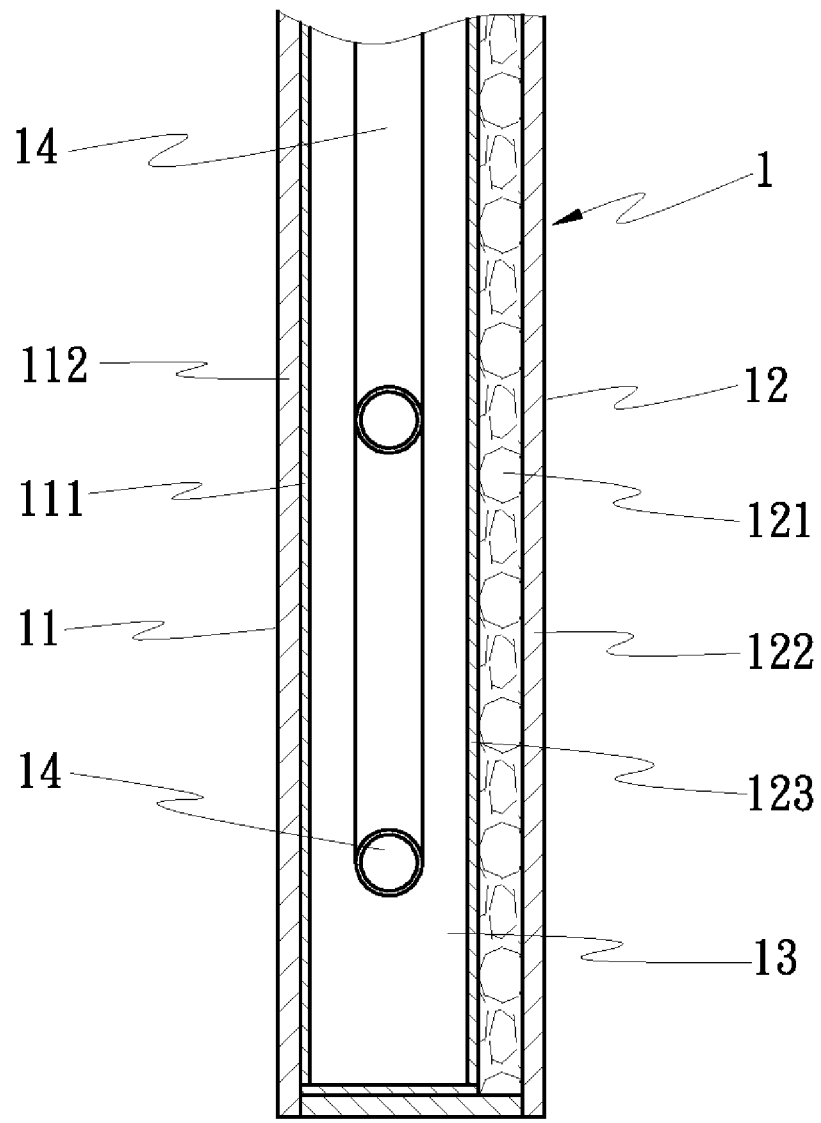
FIG. 4 is a sectional view in an enlarged scale of a part of the solar energy-based water heating and power generating module in accordance with the present invention.
Figure 5:
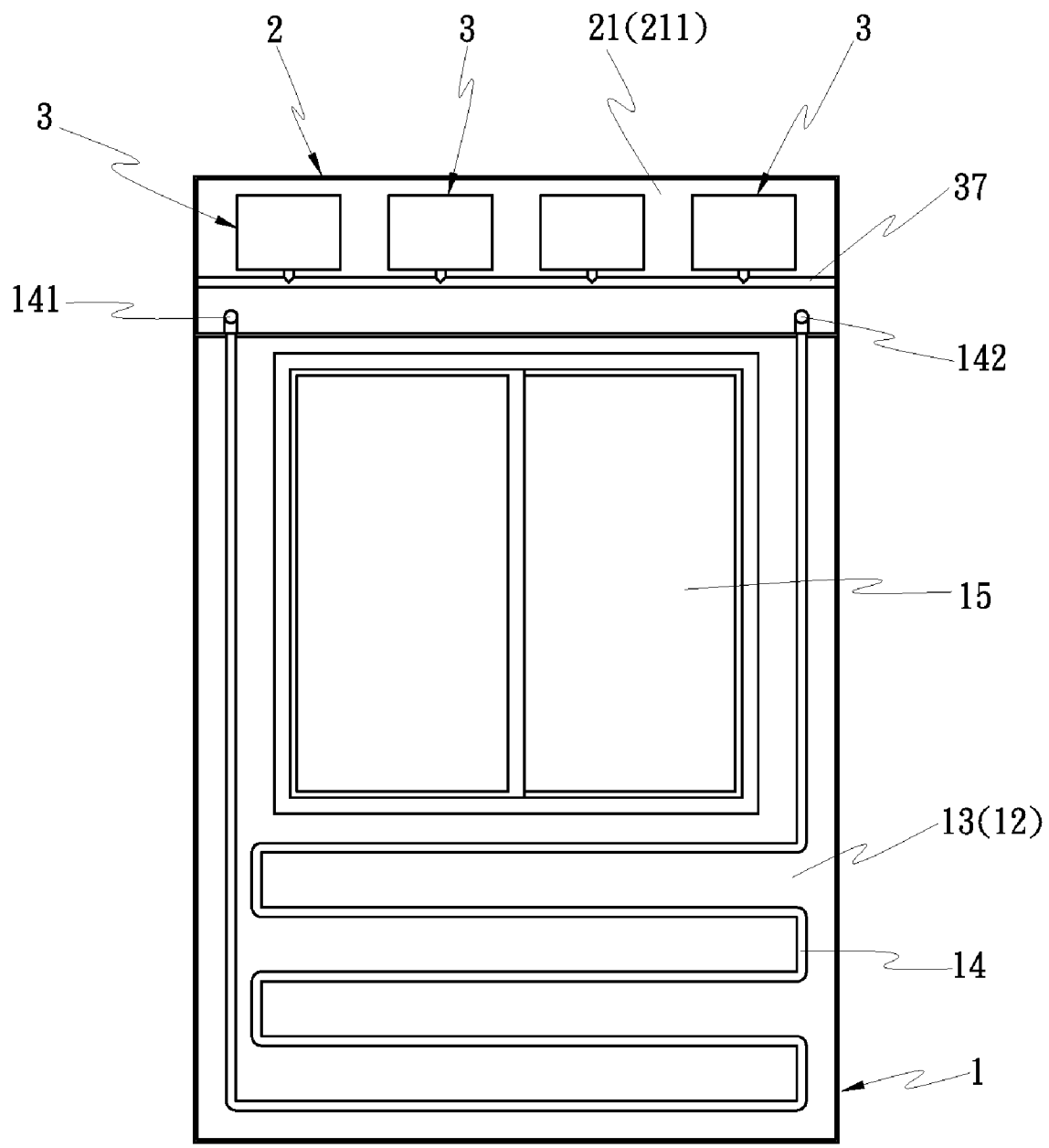
FIG. 5 is a sectional front view of an alternate form of the solar energy-based water heating and power generating module in accordance with the present invention, showing a window formed in the compound module panel.

Referring to FIGS. 1~3, the compound module panel 1 is a single-piece module panel pre-fabricated at factory and usable as an outer shell for a building, car or ship. The compound module panel 1 comprises an outer wall 11, an inner wall 12, an enclosed chamber 13 defined in between the outer wall 11 and the inner wall 12, and at least one circulation pipe 14 mounted in the enclosed chamber 13. Each circulation pipe 14 has a cold-water inlet 141 and a hot-water outlet 142 that is connected to the water chamber 2. As shown in FIG. 4, the outer wall 11 comprises an inner metal layer 111 made of a metal material having excellent heat absorbing and transferring ability, and an outer thermal conducting layer 112. The inner metal layer 111 and the outer thermal conducting layer 112 constitute a thermal collector to absorb the radiation energy of the sun. The inner wall 12 comprises an outer thermal conducting layer 122, an inner waterproof layer 123 facing the circulation pipe 14, and an intermediate heat insulation layer 121 sandwiched between the outer thermal conducting layer 122 and the inner waterproof layer 123. As shown in FIG. 5, the compound module panel 1 can be a surface member for building, having a window 15 installed therein. In this case, the circulation pipe 14 is mounted in the enclosed chamber 13 beyond the window 15.

Referring to FIGS. 1~3, the water chamber 2 is an enclosed water tank installed in the compound module panel 1 at a selected location, for example, the top side, and connected with the cold-water inlet 141 and hot-water outlet 142 of each circulation pipe 14. A power generator house 21 is formed on the compound module panel 1 and abutted against the back side of the water chamber 2 for accommodating the at least one power generator 3. The water storage chamber 2 can be shaped like a rectangular barrel, or made in any of a variety of other shapes, having a heat-insulation layer 22. The outer side of the water chamber 2 protrudes over the front side of the outer wall 11 of the compound module panel 1, having a sloping top surface 23. Thus, the water chamber 2 stops sunlight from falling upon the window 15 directly, avoiding indoors temperature rise.

Figure 6:
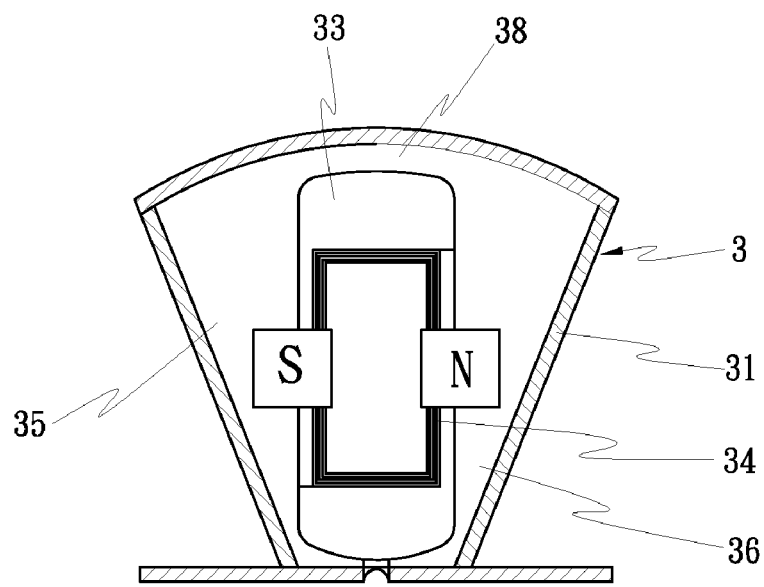
FIG. 6 is a sectional front view of a power generator for solar energy-based water heating and power generating module in accordance with the present invention.
Figure 7:
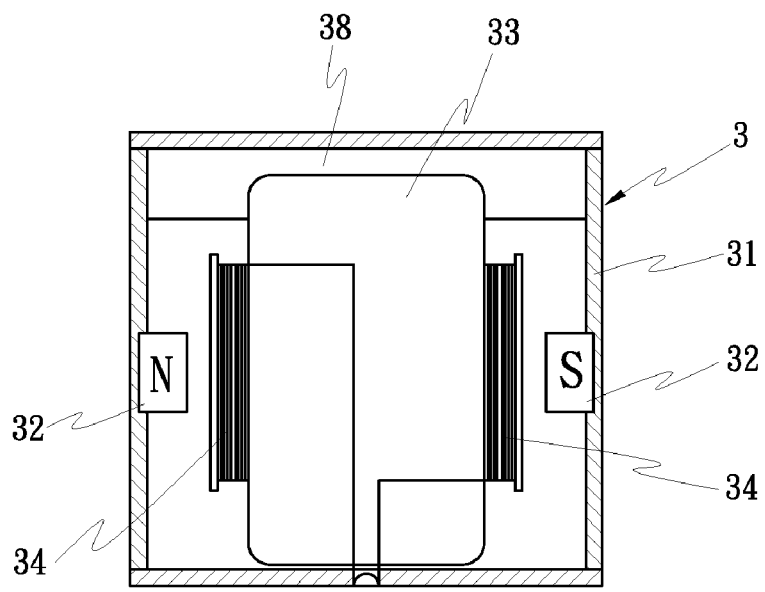
FIG. 7 is a sectional side view of FIG. 6.

Referring to FIGS. 6 and 7, each power generator 3 comprises a housing 31 that can be made in any of a variety of shapes, a field magnet set 32 formed of a N-pole magnet and a S-pole magnet and mounted inside the housing 31, an oscillator 33 set in the housing 31 between the N-pole magnet and S-pole magnet of the field magnet set 32, and a coil 34 mounted in the oscillator 33 at a selected location corresponding to the N-pole magnet and S-pole magnet of the field magnet set 32. The oscillator 33 divides the inside space 38 of the housing 31 into a hot side 35 and a cold side 36. The oscillator 33 can be oscillated between the hot side 35 and the cold side 36. After installation of each power generator 3 in the power generator house 21, the cold side 36 is kept abutted against the inner wall 211 of the power generator house 21, and the hot side 35 is abutted against the peripheral wall 25 of the water chamber 2 that is not covered by the heat-insulation layer 22. Further, multiple power generators 3 can be arranged in the power generator house 21 and connected in series or parallel by a wiring duct 37. The oscillator 33 of each power generator 3 is pivotally mounted in the respective housing 31. The hot water of the water chamber 2 provides thermal energy to the hot side 35 to heat the air in the hot side 35 causing the air in the hot side 35 to expand and to move the oscillator 33 toward the cold side 36, enabling the compressed air in the cold side 36 to move back the oscillator 33.

Figure 8:
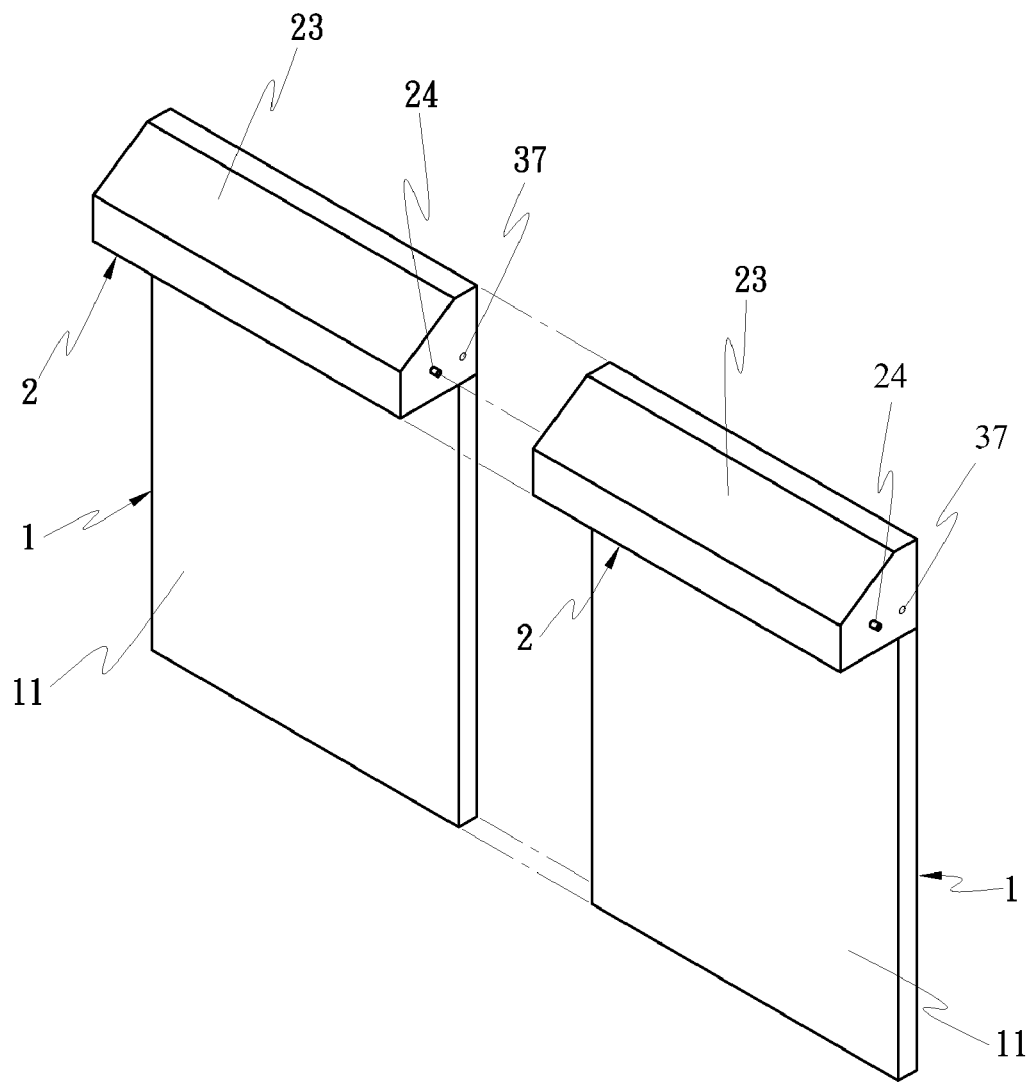
FIG. 8 is a schematic drawing showing connection of two solar energy-based water heating and power generating modules in accordance with the present invention.
Figure 9:
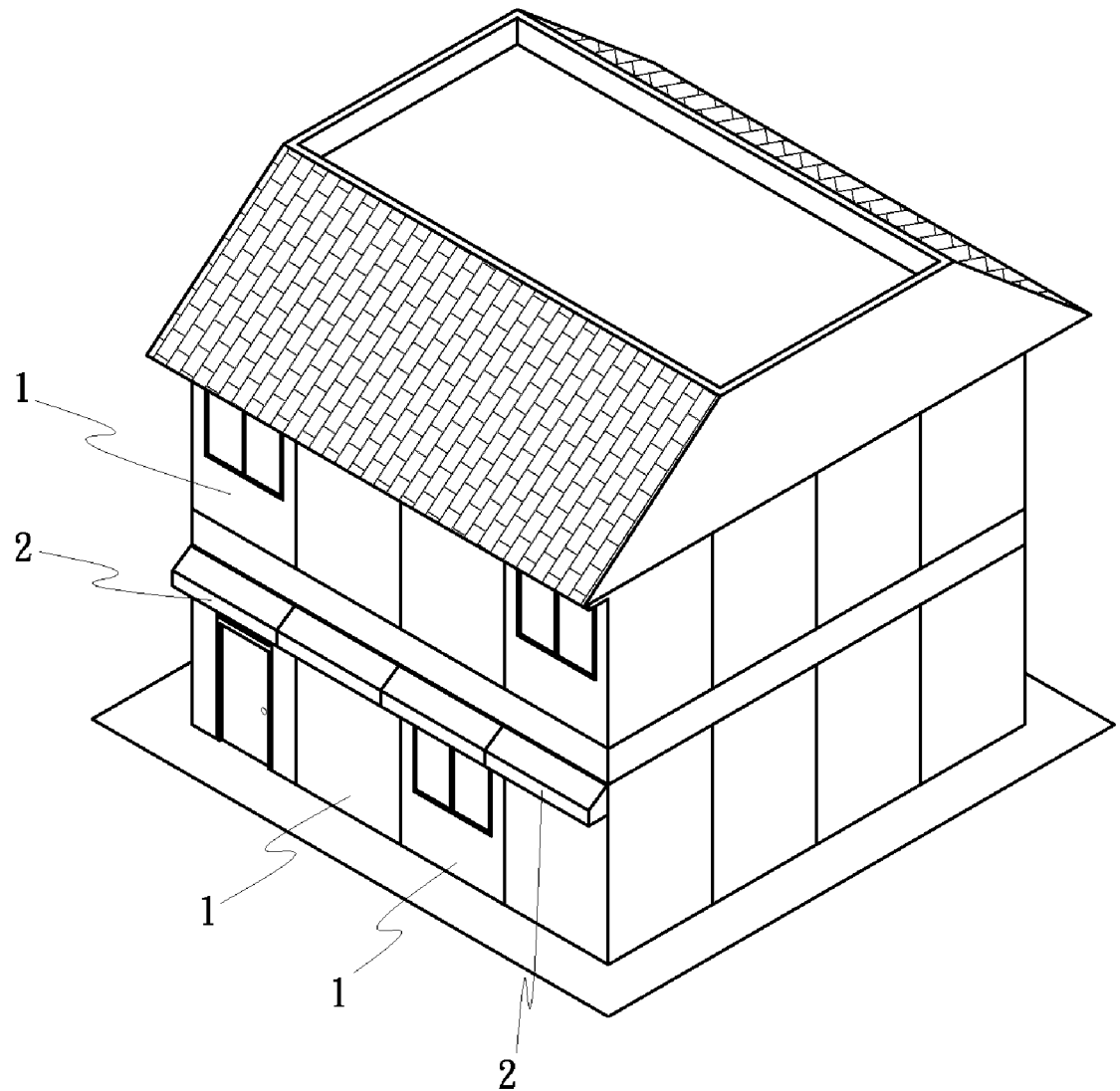
FIG. 9 is an applied view of the present invention, showing multiple solar energy-based water heating and power generating modules installed in a building.
Figure 10:
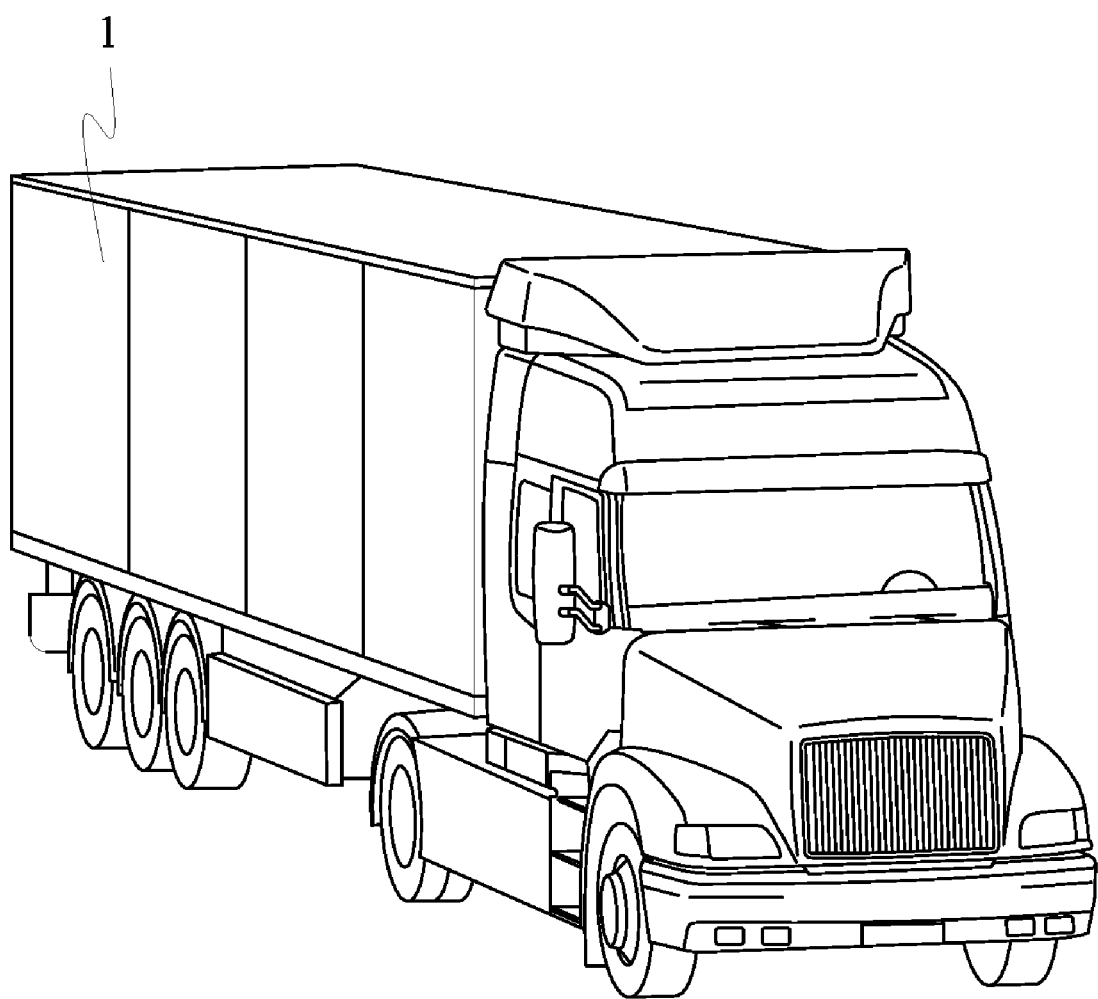
FIG. 10 is another applied view of the present invention, showing multiple solar energy-based water heating and power generating modules installed in a car.
Figure 11:
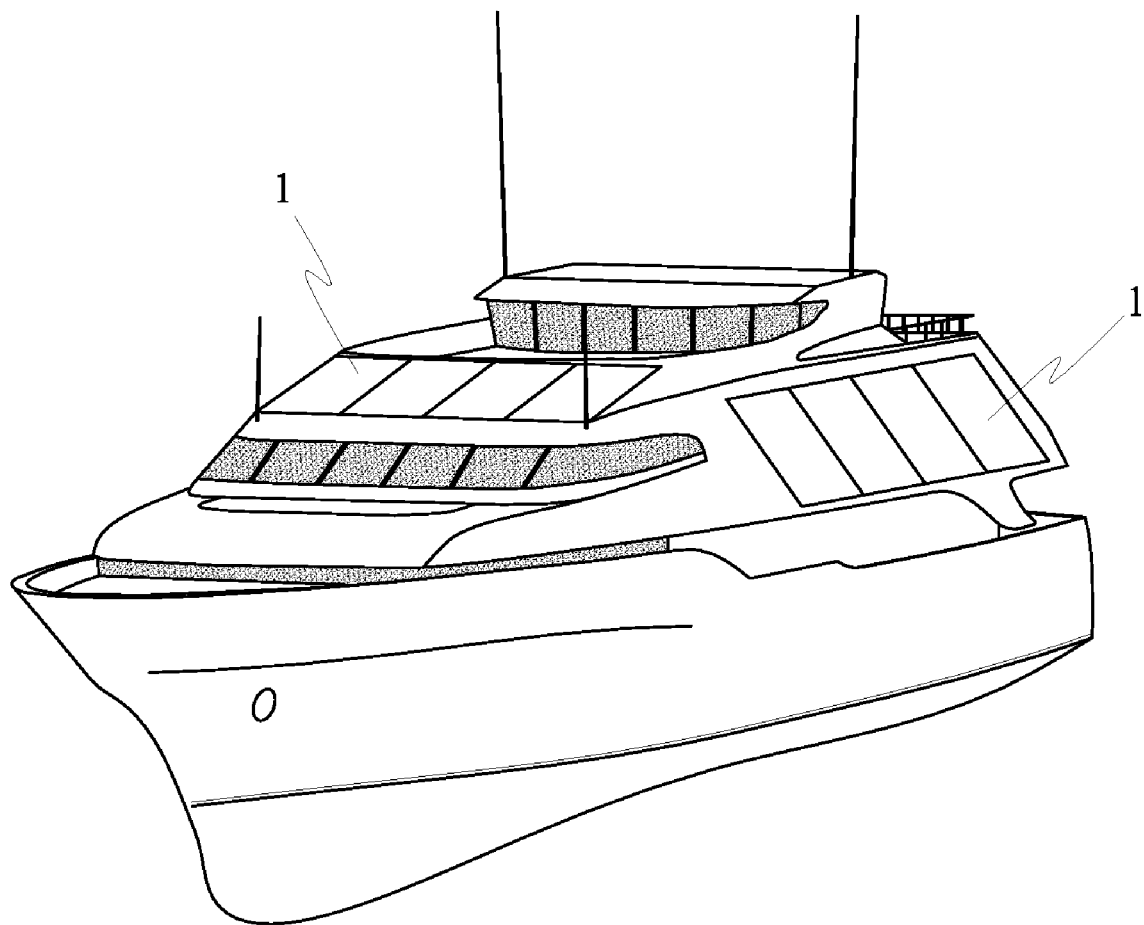
FIG. 11 is still anther applied view of the present invention, showing multiple solar energy-based water heating and power generating modules installed in a ship.

The aforesaid compound module panel 1, water chamber 2 and power generator 3 constitute a solar energy-based water heating and power generating module. A number of solar energy-based water heating and power generating modules can be connected in parallel (see FIG. 8) and installed in a building to form the outer wall or roof of the building (see FIG. 9). Alternatively, a number of solar energy-based water heating and power generating modules can be installed in a car to form the outer wall of the car (see FIG. 10) or a ship to form the outer wall of the ship (see FIG. 11).

The solar energy-based water heating and power generating module utilizes solar energy to heat water. The temperature difference between the hot water and the indoor space is further utilized to actuate power generators 3 for generating electricity. In case the solar energy-based water heating and power generating module is used in a snowing environment, an anti-freezing agent must be added to the water in the water chamber.

Figure 12:
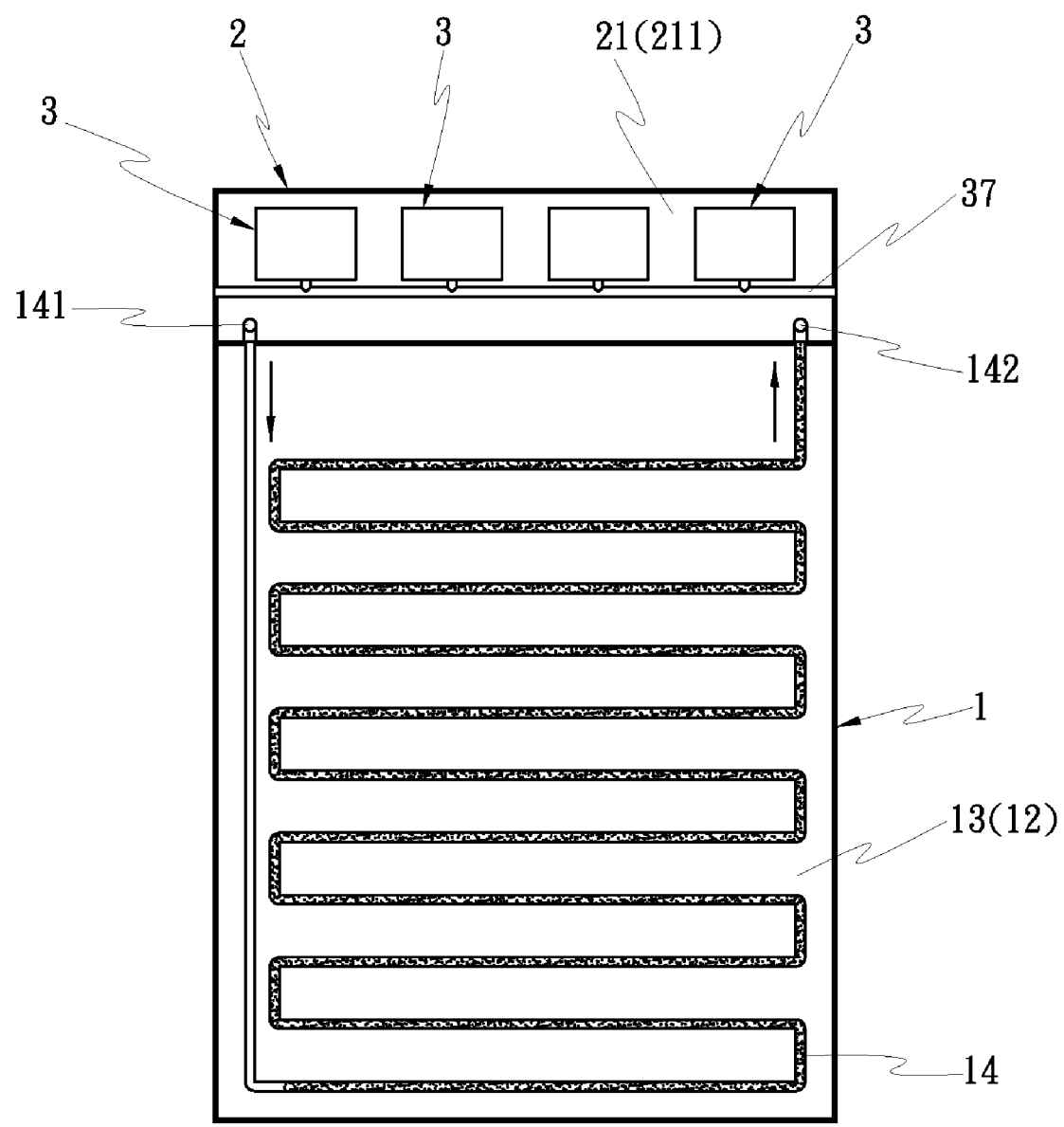
FIG. 12 is a schematic drawing of the present invention, showing circulation of water through the circulation pipe.

Referring to FIG. 12, by means of the physical characteristic that the specific gravity of cold water is greater than that of hot water, cold water flows downwards from the water chamber 2 through the circulation pipe 14 to make heat exchange with the thermal collector of the inner metal layer 111 and outer thermal conducting layer 112 of the outer wall 11 of the compound module panel 1. After absorbing a certain amount of thermal energy from the thermal collector of the inner metal layer 111 and outer thermal conducting layer 112 of the outer wall 11 of the compound module panel 1, cold water is changed to hot water. Because the specific gravity of hot water is smaller than cold water, hot water is then forced back to the water chamber by cold water, completing one circulation cycle. The performance of this circulation cycle eliminates the drawback of power loss of a mechanical circulation system. The compound module panel 1 preferably has the size of 50 cm×300 cm for building construction application. The hot-water supply capacity is determined subject to the size of the window. If the compound module panel is not equipped with a window, the hot-water supply capacity can be set to be 100 liters. According statistics, one person uses about 40 liters of hot water at a time. Therefore, one single compound module panel 1 can satisfy hot water requirement for 2~3 person-times.

Figure 13:
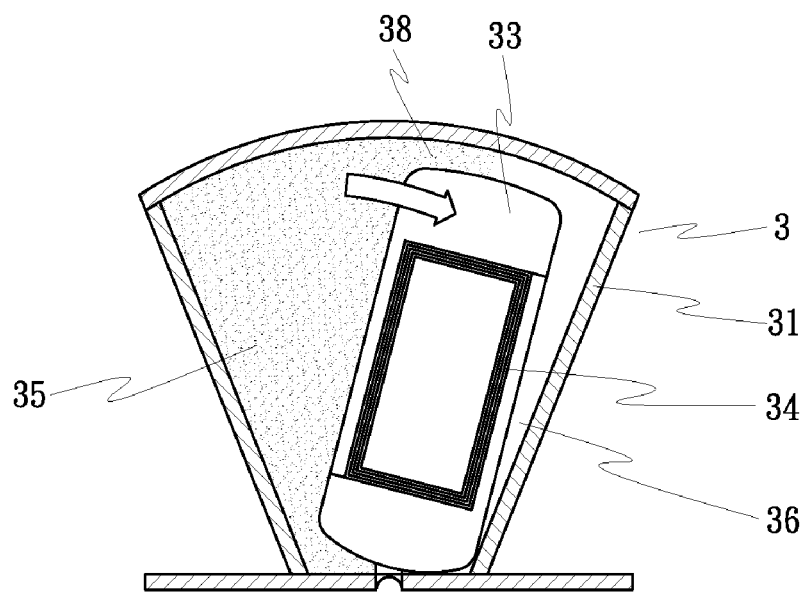
FIG. 13 is a schematic drawing of a part of the present invention, showing the operation of the power generator (I).
Figure 14:
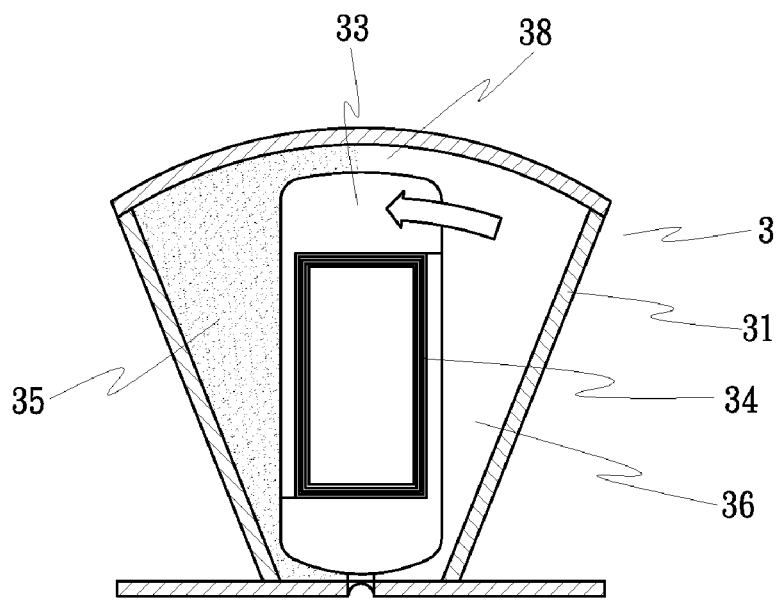
FIG. 14 is a schematic drawing of a part of the present invention, showing the operation of the power generator (II).

By means of setting the power generator 3 between the water chamber 2 and the inside wall of a building, car or ship, the thermal energy of the hot water in the water chamber 2 is transferred to the hot side 35 in the power generator 3 to expand the air in the hot side 35 and to further move the oscillator 33 (see FIG. 13), causing the power generator 3 to generate electricity. Further, because the indoor temperature of the building, car, ship or flying object is relatively lower, the cold side 36 is kept at a relatively lower temperature status to cool down the hot air, causing the air to contract and to force back the oscillator 33 (see FIG. 14), and therefore the oscillator 33 is forced to oscillate. Oscillation of the oscillator 33 results in intercutting between the magnetic fields of the coil 34 and the magnet set 32, and therefore electricity is generated subject to Lenz's law. One power generator 3 has a small size and provides a small capacity. However, a number of power generators 3 can be connected in series, providing a high capacity.

Further, the compound module panel 1 is a pre-fabricated member. By means of mass production at factory, the cost of the compound module panel 1 can be greatly reduced. When the compound module panel 1 is damaged, it can be directly replaced by a new one, avoiding impact to the sense of beauty of the surface structure of the building, car or ship. By means of quick connectors 24 and wiring ducts 37, multiple solar energy-based water heating and power generating modules can be quickly connected together (see FIG. 8), facilitating installation. Further, the compound module panel 1 can be painted or covered with a covering, showing a color design to attract people's eyes. However, any color design shall not lower the performance of the solar energy-based water heating and power generating module in absorbing the radiation energy of the sun for heating water.

Further, the application of the present invention provides the outer appearance of the building, car or ship with a high-tech sense of beauty, eliminating the drawback of a conventional solar water heater that protrudes over the outer wall of the building, car or ship in which it is installed.

A prototype of solar energy-based water heating and power generating module has been constructed with the features of FIGS. 1~14. The solar energy-based water heating and power generating module functions smoothly to provide all of the features disclosed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A solar energy-based water heating and power generating module, comprising:
    a compound module panel, said compound module panel comprising an outer wall adapted to absorb solar energy, an inner wall opposite to said outer wall, an enclosed chamber defined between said outer wall and said inner wall, and a circulation pipe arranged in said enclosed chamber for making heat exchange with said outer wall, said circulation pipe comprising a cold-water inlet and a hot-water outlet;
    a water chamber mounted at a top side of said compound module panel in water communication with said cold-water inlet and said hot-water outlet;
    a power generator house abutting a back side of said water chamber; and
    at least one power generator mounted in said power generator house, each said power generator comprising a housing, a field magnet set fixedly mounted inside said housing, an oscillator pivotally mounted inside said housing, and a coil mounted on said oscillator, whereby the oscillator is actuatable to oscillate by air expansion and contraction inside the housing due to a temperature difference and to further generate electricity.

2. The solar energy-based water heating and power generating module as claimed in claim 1, wherein said outer wall of said compound module panel comprises an inner metal layer and an outer thermal conducting layer covering said inner metal layer.

3. The solar energy-based water heating and power generating module as claimed in claim 1, wherein said inner wall of said compound module panel comprises an outer thermal conducting layer and an inner heat insulation layer.

4. The solar energy-based water heating and power generating module as claimed in claim 3, wherein said inner wall of said compound module panel further comprises a waterproof layer covered on an inner side of said inner heat insulation layer.

5. The solar energy-based water heating and power generating module as claimed in claim 1, wherein said compound module panel has a window mounted therein.

6. The solar energy-based water heating and power generating module as claimed in claim 1, wherein said water chamber is peripherally covered with a heat insulation layer.

7. The solar energy-based water heating and power generating module as claimed in claim 1, wherein said at least one power generator comprises a plurality of power generators connected together by wiring conduits.

8. A solar energy-based water heating and power generating module, comprising:
    a compound module panel, said compound module panel comprising an outer wall adapted to absorb solar energy, an inner wall opposite to said outer wall, an enclosed chamber defined between said outer wall and said inner wall, and a circulation pipe arranged in said enclosed chamber for making heat exchange with said outer wall, said circulation pipe comprising a cold-water inlet and a hot-water outlet;
    a water chamber mounted at a top side of said compound module panel in water communication with said cold-water inlet and said hot-water outlet;
    a power generator house abutting against a back side of said water chamber; and
    at least one power generator mounted in said power generator house, each said power generator comprising a housing, a field magnet set fixedly mounted inside said housing, an oscillator pivotally mounted inside said housing and dividing the inside space of said housing into a hot side that abuts against said water chamber and a cold side that abuts against said inner wall of said compound module panel, and a coil mounted on said oscillator, whereby the oscillator is actuatable by a temperature difference to oscillate and to further generate electricity.

9. The solar energy-based water heating and power generating module as claimed in claim 8, wherein said outer wall of said compound module panel comprises an inner metal layer and an outer thermal conducting layer covering said inner metal layer.

10. The solar energy-based water heating and power generating module as claimed in claim 8, wherein said inner wall of said compound module panel comprises an outer thermal conducting layer and an inner heat insulation layer.

11. The solar energy-based water heating and power generating module as claimed in claim 10, wherein said inner wall of said compound module panel further comprises a waterproof layer covered on an inner side of said inner heat insulation layer.

12. The solar energy-based water heating and power generating module as claimed in claim 8, wherein said compound module panel has a window mounted therein.

13. The solar energy-based water heating and power generating module as claimed in claim 8, wherein said water chamber is peripherally covered with a heat insulation layer.

14. The solar energy-based water heating and power generating module as claimed in claim 8, wherein said at least one power generator comprises a plurality of power generators connected together by wiring conduits.

15. The solar energy-based water heating and power generating module as claimed in claim 8, wherein the field magnet set of each said power generator comprises a N-pole magnet and a S-pole magnet.

* * * * *